United States Patent
Kim (10) Patent No.: US 12,321,946 B2
(45) Date of Patent: Jun. 3, 2025

(54) REFUND SERVICE PROVIDING METHOD AND APPARATUS BASED ON REFUND DEGREE INFORMATION

(71) Applicant: OASIS CO., LTD., Seongnam-si (KR)

(72) Inventor: Young Jun Kim, Seoul (KR)

(73) Assignee: OASIS CO., LTD., Seongnam-si (KR)

( * ) Notice: Subject to any disclaimer, the term of this patent is extended or adjusted under 35 U.S.C. 154(b) by 233 days.

(21) Appl. No.: 18/021,285

(22) PCT Filed: May 25, 2021

(86) PCT No.: PCT/KR2021/006480
§ 371 (c)(1),
(2) Date: Feb. 14, 2023

(87) PCT Pub. No.: WO2022/050531
PCT Pub. Date: Mar. 10, 2022

(65) Prior Publication Data
US 2023/0298040 A1    Sep. 21, 2023

(30) Foreign Application Priority Data
Sep. 3, 2020 (KR) .................. 10-2020-0112506

(51) Int. Cl.
*G06Q 30/00* (2023.01)
*G06Q 30/015* (2023.01)
*G06Q 30/02* (2023.01)

(52) U.S. Cl.
CPC ....... *G06Q 30/015* (2023.01); *G06Q 30/0281* (2013.01)

(58) Field of Classification Search
CPC .. G06Q 30/015; G06Q 30/0281; G06Q 30/02; G06Q 30/06; G06Q 50/10; G06Q 30/0234; G06Q 30/0635; G06Q 30/0641
See application file for complete search history.

(56) References Cited

U.S. PATENT DOCUMENTS

| | | | |
|---|---|---|---|
| 2004/0122751 A1* | 6/2004 | Kurtz | G06Q 30/02 705/30 |
| 2016/0350756 A1* | 12/2016 | Shepard | G06Q 20/047 |
| 2019/0340611 A1* | 11/2019 | Millhouse | G06Q 10/0838 |

FOREIGN PATENT DOCUMENTS

| KR | 10-2002-0068943 A | 8/2002 |
|---|---|---|
| KR | 10-1159416 B1 | 7/2012 |

(Continued)

OTHER PUBLICATIONS

Swift Response H&R Block Predicts Soaring Profits as Filers Flock in to Use Speedy Refund Service.: [Sun-Sentinel Edition] Reuters. Sun Sentinel: 1D. Fort Lauderdale: Tribune Publishing Company, LLC. (Apr. 11, 1990) (Year: 1990).*

(Continued)

*Primary Examiner* — Matthew T Sittner
(74) *Attorney, Agent, or Firm* — Bridgeway IP Law Group, PLLC; Jihun Kim (57) ABSTRACT

A refund service providing method comprises: selecting, by a user terminal, at least one product to be refunded from among at least one ordered product; obtaining, from the user terminal, refund request information including image information regarding the product to be refunded, refund degree information, and refund comment information; obtaining, from a terminal in charge of refunds, refund determination information regarding the refund degree information, based on the image information and the comment information, wherein the refund determination information includes information indicating approval or rejection; obtaining, from a terminal in charge of refunds, refund determination information regarding the refund degree information, based on the image information and the comment information, wherein the refund determination information includes information indicating approval or rejection; and when the refund determination information includes the information (Continued)

indicating approval, providing, to the user terminal, the information indicating approval and points according to the refund degree information.

3 Claims, 4 Drawing Sheets

(56) References Cited

FOREIGN PATENT DOCUMENTS

| | | |
|---|---|---|
| KR | 10-2015-0044035 A | 4/2015 |
| KR | 10-1577402 B1 | 12/2015 |
| KR | 10-2020-0065249 A | 6/2020 |

OTHER PUBLICATIONS

Tax Refund Services Can Attract the Unbanked American Banker 170.165: 10. New York, N.Y.: SourceMedia dba Arizent. (Aug. 26, 2005) (Year: 2005).*

Green Dot Corporation To Offer Tax Refund Service Through Acquisition Seward, John. Benzinga NewswiresSouthfield: Accretive Capital LLC d/b/a Benzinga. (Sep. 18, 2014) (Year: 2014).*

* cited by examiner

REFUND SERVICE PROVIDING METHOD AND APPARATUS BASED ON REFUND DEGREE INFORMATION

TECHNICAL FIELD

The present invention relates to a method and an apparatus for providing a refund service based on refund degree information, and more particularly, to a method and an apparatus for considering a refund degree directly determined by a user to provide an appropriate refund service.

BACKGROUND ART

Recently in the information age, delivery services based on remote orders through the Internet and the like have been activated. However, since a user orders a product through the remote order without directly checking the product using the naked eye, there may be many cases in which the delivered product is different from the product expected by the user. In this case, the user may request a refund for the delivered product.

However, most of refund services in the related art are classified as a fully refundable or non-refundable. When the reason for the refund contains subjective factor, the extremely divided refund policy particularly causes many problems.

DISCLOSURE

Technical Problem

In order to solve the above mentioned problems, an object of the present invention is to provide a refund service providing method based on refund degree information.

In order to solve the above mentioned problems, another object of the present invention is to provide a refund service providing apparatus based on refund degree information.

Technical Solution

In order to achieve the above objects, the refund service providing method based on refund degree information according to one embodiment of the present invention, includes: selecting, by a user terminal, at least one product to be refunded from among at least one ordered product; obtaining, from the user terminal, refund request information including image information regarding the product to be refunded, refund degree information, and refund comment information; obtaining, from a terminal in charge of refunds, refund determination information regarding the refund degree information, based on the image information and the comment information, in which the refund determination information includes information indicating approval or rejection; and when the refund determination information includes the information indicating approval, providing, to the user terminal, the information indicating approval and points according to the refund degree information.

In order to achieve the above objects, the refund service providing apparatus based on refund degree information according to one embodiment of the present invention, includes a processor and a memory for storing at least one command executed through the processor, wherein the at least one command may be executed so that at least one product to be refunded is selected from among at least one ordered product by a user terminal, may be executed to obtain, from the user terminal, refund request information including image information regarding the product to be refunded, refund degree information, and refund comment information, may be executed so that refund determination information regarding the refund degree information is obtained from a terminal in charge of refunds, based on the image information and the comment information, in which the refund determination information includes information indicating approval or rejection, and may be executed, when the refund determination information includes the information indicating approval, so that the information indicating approval and points according to the refund degree information are provided to the user terminal.

Advantageous Effects

According to the present invention, a differential refund considering a refund degree may be provided unlike the related art in which only the full refundable or non-refundable option is available, so that a reasonable refund service can be provided to the user.

According to the present invention, the user may select a refund degree to request a refund, so that the level of refund desired by the user can be identified and responded in advance to process the refund.

According to the present invention, even when a subjective factor such as degree of taste is included in the reason for refund, the user may directly determine and input the level, so that the use can be easily respond.

BEST MODE

Mode for Invention

The present invention may be applied with various modifications and have various embodiments, and specific embodiments will be illustrated in the drawings and described in the detailed description in detail. However, it will be understood that it is not intended to limit the present invention to the specific embodiments, and the invention is intended to cover all modifications, equivalents, and alternatives falling within the spirit and scope without departing from the idea of the invention. Similar reference numerals are used for similar elements in describing the drawings.

Although the terms such as first, second, A and B may be used to describe various elements, the above elements will not be limited by the above terms. The terms are used only for the purpose of distinguishing one element from another element. For example, the first element may be referred to as the second element without departing from the scope of the present invention, and similarly, the second element may also be referred to as the first element. The term "and/or" includes any one of a plurality of relevant listed items or a combination thereof.

When one element is referred to as being "linked" or "connected" to other element, the element may be directly liked or connected to the other element, but it will be understood that another element may be present therebetween. On the contrary, when one element is referred to as being "directly linked" or "directly connected" to the other element, it will be understood that another element is not present therebetween.

The term used herein is merely for the purpose of illustrating a particular embodiment, and it is not intended to limit the present invention. A singular expression, unless the context clearly means otherwise, includes a plural expression. Herein, it will be understood that the term such as "include" and "have" is intended to designate the presence of feature, number, step, operation, element, component, or a combination thereof recited in the specification, which does not preclude the possibility of the presence or addition of one or more other features, numbers, steps, operations, elements, components, or combinations thereof.

Unless otherwise defined, all terms used herein including technical or scientific terms have the same meaning as commonly understood by those having ordinary skill in the art. Terms such as those defined in generally used dictionaries will be interpreted to have the meaning consistent with the meaning in the context of the related art, and will not be interpreted as an ideal or excessively formal meaning unless expressly defined in the present invention.

Hereinafter, exemplary embodiments of the present invention will be described in more detail with reference to the accompanying drawings. In order to facilitate the overall understanding in describing the present invention, the same reference numerals are used for the same components in the drawings, and redundant descriptions of the same components will be omitted.

Figure 1:
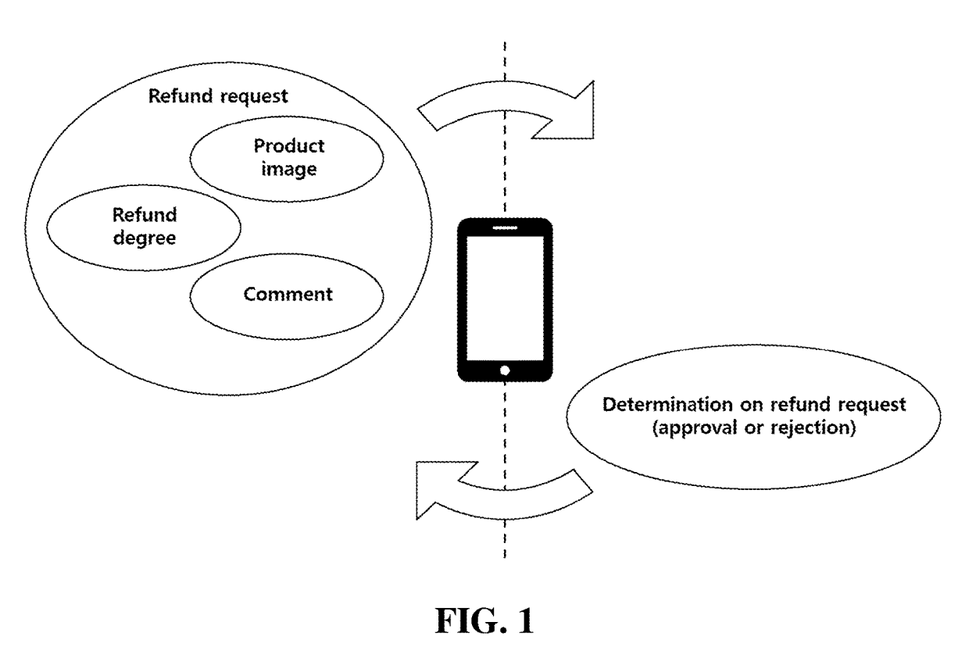
FIG. 1 is a concept diagram for explaining a refund service providing method based on refund degree information according to one embodiment of the present invention.

FIG. 1 is a concept diagram for explaining a refund service providing method based on refund degree information according to one embodiment of the present invention.

Referring to FIG. 1, according to one embodiment of the present invention, refund degree information is further used, so that a more effective refund service may be provided unlike general refund services. In other words, according to one embodiment, the refund may be requested based on a product image, a refund degree and a comment, the product image and the comment may be referred to determine whether the requested refund degree is appropriate, and a determination result may be provided. The user may request the above-described refund through a user terminal including various computing smart devices such as a smartphone, and may be provided with the determination result.

The product image may refer to an image of the product to be refunded, and may include an image showing a reason for the refund. For example, when a refund is requested due to a damage to the product, an image showing the damaged part of the product may be used. In addition, the comment may refer to a comment written or entered by the user, and may include a refund reason and/or complaint information. The comment may be information in text format, however, the present invention is not limited thereto.

The refund degree may be information indicating appropriate money to be refunded from the total amount when the user directly determines the money. For example, the refund degree may include information such as whether the full amount of the purchase price of the product to be refunded is refunded, whether 80% is refunded, whether 60% is refunded, whether 40% is refunded or 20% is refunded, which may be directly selected by the user through the user terminal.

For example, the refund degree may be divided into a plurality of preset refund degree stages, and one of the stages may be selected by the user. In this case, each stage may indicate different percentage information. Alternatively, for example, the user may directly input the percentage information for the refund degree. For example, the refund degree may include a total of 4 levels, in which the percentages may represent 25%, 50%, 75% and 100%; or may include a total of 5 levels, in which the percentages may represent 20%, 40%, 60%, 80% and 100%. However, this is an example, and the present invention is not limited thereto.

According to one embodiment, it may be determined, based on the above-described product image, refund degree and comment, whether the refund request is appropriate through a terminal in charge of refunds. In other words, the terminal in charge of refunds may check the image and/or comment of the product inputted from the user terminal, and may determine whether the refund degree inputted from the user terminal is appropriate. Further, the terminal in charge of refunds may determine whether the refund degree is appropriate and input refund determination information. The refund determination information may include information indicating approval when the refund request is appropriate, and may include information indicating rejection when the refund request is not appropriate.

For example, when the refund request is appropriate and the refund determination information includes information indicating approval, points derived based on the refund degree inputted by the user may be provided to the user. In other words, the derived points may be paid to the user. The points may be derived based on the refund degree selected by the user, that is, percentage information corresponding to the refund degree and price information of the product to be refunded. However, when the refund degree represents a full refund, that is, 100%, the refund may be performed by canceling the payment of the product to be refunded.

For example, the points may be derived by considering not only the refund degree and the price information of the product to be refunded, but also member level information of the user. For example, when the membership level information is further considered, the percentage may be increased according to the member level information. In other words, the percentage information may be derived based on the refund degree and the membership level information. For example, the percentage obtained by adding a first percentage (a) according to the refund degree and a second percentage (b) derived by multiplying the first percentage by an additional percentage according to the member level information may be derived as final percentage information (a+a*b), and the points (c*(a+a*b)) may be derived based on the final percentage information and price information (c). Herein, "*" may represent a multiplication operation. For example, when the first percentage is 40% and the second percentage is 20%, the final percentage may be derived as 48%. For example, the second percentage may be divided according to the membership level information, and may be divided into 5%, 10% and 20% depending on the membership level. However, the present invention is not limited thereto.

Alternatively, for example, when the refund request is appropriate and the refund determination information includes information indicating rejection, the refund degree may be modified by the terminal in charge of refunds, and a modification comment of the terminal in charge of refunds may also be inputted. In this case, according to one embodiment, the modified refund degree information and the modification comment information obtained from the terminal in charge of refunds may be provided to the user terminal. The modified refund degree information may indicate a refund degree having a percentage different from the above-described refund degree inputted by the user, and the modification comment information may include information about a reason and the like for modifying the refund degree by a person in charge of refunds.

In this case, the user terminal may obtain the above-described modified refund degree information and the modification comment information, and the user may check the information and then approve or disapprove the modified refund degree. In other words, According to one embodiment, modified refund determination information including information indicating approval or disapproval may be obtained through the user terminal. When the modified refund determination information includes the information indicating approval, points may be derived based on the modified refund degree as described above and provided to the user.

However, according to one embodiment, when the modified refund determination information includes the information indicating disapproval, the user terminal may be instructed to select chat consultation or phone consultation. This procedure may be provided immediately after the user refund request and rejection procedure described above is performed once, or may be provided after being performed twice.

According to one embodiment, when the user selects chat consultation among chat consultation and phone consultation through the user terminal, the user terminal may be provided with chat room link information through which chatting may be performed with the terminal in charge of refunds. In this case, the user may enter a chat room through the chat room link information, and may conduct additional negotiation by chatting with the person in charge of refunds of the terminal in charge of refunds. Alternatively, according to one embodiment, when the user selects phone consultation among chat consultation and phone consultation through the user terminal, contact information of the user terminal may be provided to the terminal in charge of refunds. In this case, the user may receive a call from the terminal in charge of refunds, and may conduct additional negotiation by performing a phone call with the person in charge of refunds of the terminal in charge of refunds.

Further, according to one embodiment of the present invention, base information or reference information may be provided to the user in order to assist the user in selecting the refund degree. For example, the base information or the reference information may include information on refund cases related to the product to be refunded selected by the user. Alternatively, when there is no refund case related to the product to be refund or the number of cases is less than or equal to a predetermined number, the base information or the reference information may include refund case information related to the same type of product as the product to be refunded. The refund case information may include image information inputted by the refund requester for the products to be refunded or the same type of products that have been previously refunded, and refund degree information as a refund result, and the user may refer to the above information to select the refund degree.

Figure 2:
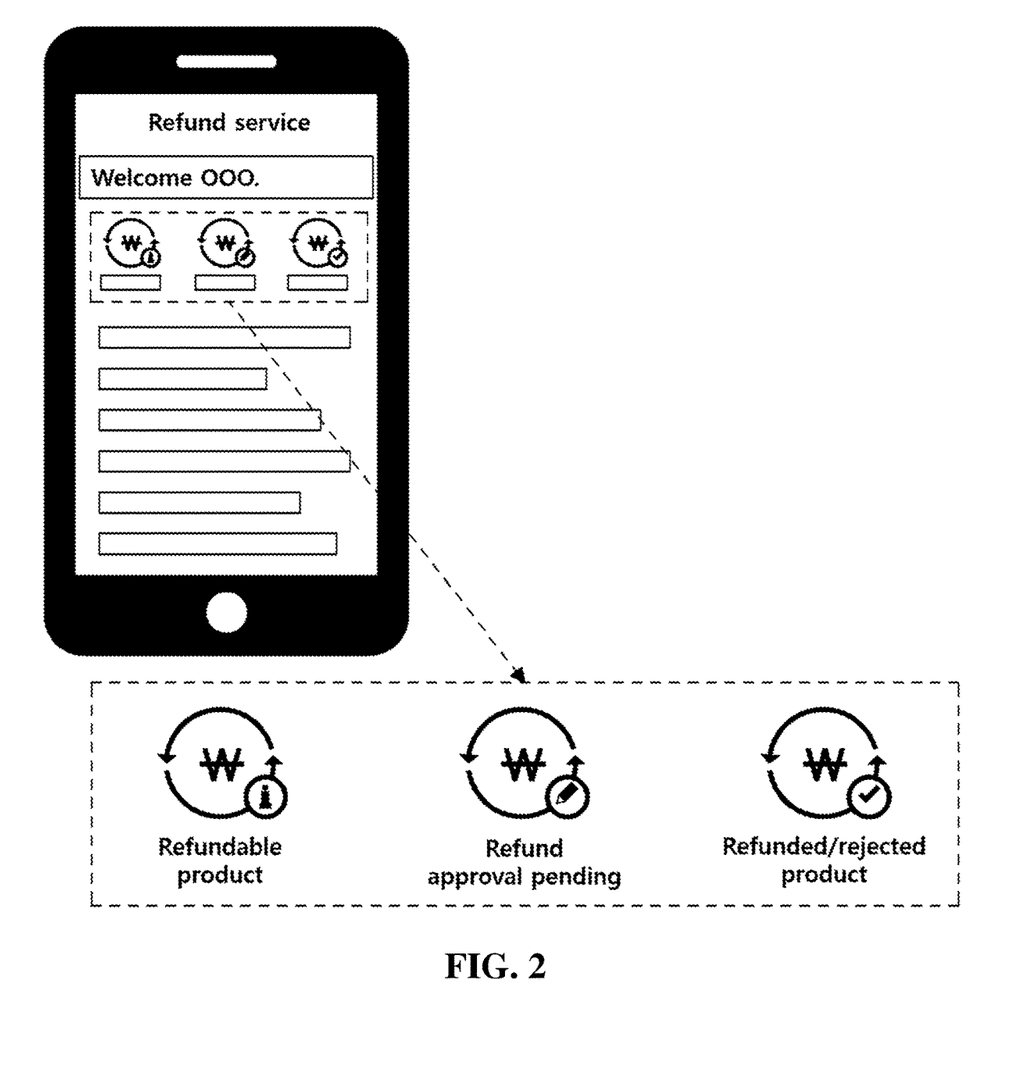
FIG. 2 is a screen of a user terminal for explaining the refund service according to one embodiment of the present invention.

FIG. 2 is a screen of a user terminal for explaining the refund service according to one embodiment of the present invention.

Referring to FIG. 2, according to one embodiment, information on refundable products among refund services, information on pending refund approvals or information on approved/rejected products may be provided through the screen of the user terminal. FIG. 2 shows the user terminal in the form of a smartphone. However, the present invention is not limited thereto, and the above-described information may be used through various smart devices such as PCs or tablets.

For example, the information on refundable products may include information on products for which refund request is allowed among products previously ordered by the user. For example, the refund request may be allowed within one week from delivery completion, and the information on refundable products may include only the information on at least one product, among the products previously ordered by the user, for which delivery is completed within a week from now.

For example, the information on pending refund approvals may include information on a product to be refunded for which the user requests a refund together with the product image, the refund degree and the comment with respect to at least one product included in the information on the refundable products. In other words, when the user requests a refund for a specific product to be refunded and then the refund determination information indicating approval or return is not been confirmed yet, the information on pending refund approvals may include information on the specific product to be refunded. In the information on the specific product to be refunded that appears in the information on pending refund approvals, the product image, the refund degree, and the comment inputted by the user may be checked.

For example, the information on approved/rejected products may include information processed for the refund request of the user. In other words, refund determination information on the user's refund request may be included in the information on approved/rejected products, and information indicating approval or rejection of the refund request may be included in the refund determination information. When the refund determination information includes information indicating approval, information on the product image, refund degree and comment inputted by the user, and points calculated according to the refund degree may be included and provided in the information on approved/rejected products. However, when the refund determination information includes information indicating rejection, information on the product image, refund degree and comment inputted by the user, the modified refund degree, and the modification comment may be included and provided in the information on the approved/rejected products. In addition, subsequent procedures, for example, procedures related to approval or disapproval of the modified refund degree, and relevant information may also be included and provided in the information on the approved/rejected products.

Figure 3:
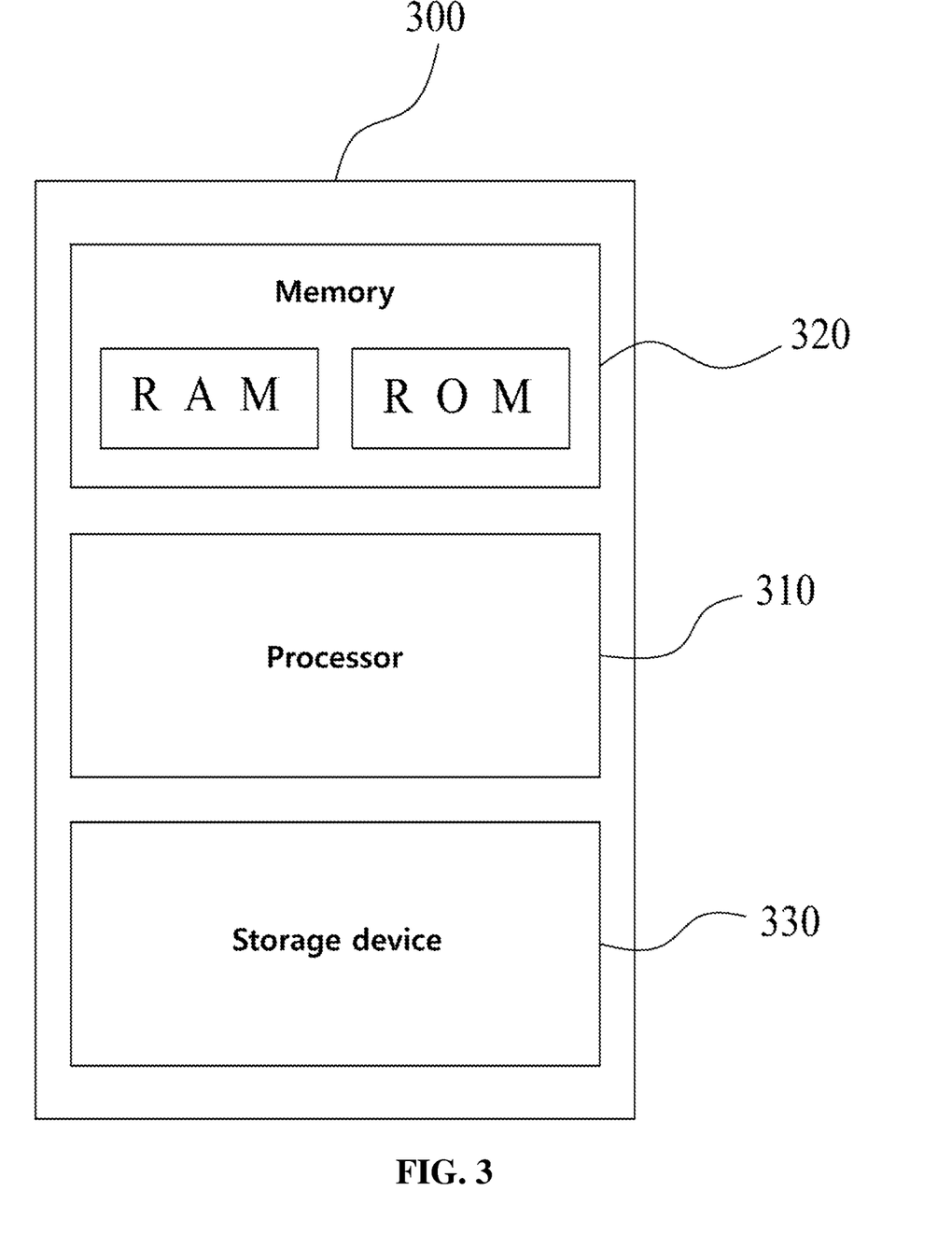
FIG. 3 is a block diagram of a refund service providing apparatus based on refund degree information according to one embodiment of the present invention.

FIG. 3 is a block diagram of a refund service providing apparatus based on refund degree information according to one embodiment of the present invention.

Referring to FIG. 3, the refund service providing apparatus 300 according to one embodiment of the present invention may include at least one processor 310, memory 320 and storage device 330. For example, the refund service providing apparatus according to one embodiment may be a refund service providing server, or may be a server providing other services when the refund service providing method is also performed in the server providing the other services. For example, the user terminal according to one embodiment may be a computing and portable user terminal such as a smartphone or tablet, and may provide functions according to the embodiments through applications. Alternatively, for example, the user terminal according to one embodiment may be a terminal such as a non-portable PC, and may be provided with functions according to the embodiments through a web browser or an application. Alternatively, for example, the terminal in charge of refunds may also be the same as or similar to the user terminal, and may be provided with the same or similar functions according to the embodiments.

The processor 310 may execute a program command stored in the memory 320 and/or the storage device 330. The processor 310 may refer to a central processing unit (CPU), a graphics processing unit (GPU), or a dedicated processor on which methods according to the present invention are performed. The memory 320 and the storage device 330 may be formed of a volatile storage medium and/or a non-volatile storage medium. For example, the memory 320 may include a read only memory (ROM) and/or a random access memory (RAM).

The memory 320 may store at least one command executed through the processor 310. The at least one command may include a command of selecting, by a user terminal, at least one product to be refunded from among at least one ordered product, a command of obtaining, from the user terminal, refund request information including image information regarding the product to be refunded, refund degree information, and refund comment information, a command of obtaining, from a terminal in charge of refunds, refund determination information regarding the refund degree information, based on the image information and the comment information, in which the refund determination information includes information indicating approval or rejection, and a command, when the refund determination information includes the information indicating approval, of providing, to the user terminal, the information indicating approval and points according to the refund degree information.

For example, the at least one command may further include a command, when the refund determination information includes information indicating rejection, of obtaining modified refund degree information and modification comment information from the terminal in charge of refunds, and a command of providing the modified refund degree information, the modification comment information, and the information indicating rejection to the user terminal.

In this case, the at least one command may further include a command of obtaining modified refund determination information for the modified refund degree information from the user terminal in which the modified refund determination information includes information indicating approval or disapproval, and a command, when the modified refund determination information includes the information indicating approval, of providing points according to the modified refund degree information to the user terminal. In addition, the at least one command may further include a command, when the modified refund determination information includes the information indicating disapproval, of selecting chat consultation or phone consultation by the user terminal, a command, when the chat consultation is selected, of providing the user terminal with chat room link information for allowing a chat with the terminal in charge of refunds, and a command, when the phone consultation is selected, of providing contact information of the user terminal to the terminal in charge of refunds.

The refund degree information may be one stage selected by the user terminal from among a plurality of preset refund degree stages, the refund degree stages may represent percentage information different from each other, and the points may be derived based on percentage information indicated by the selected one stage and price information of the product to be refunded.

Alternatively, for example, the at least one command may further include a command of providing the user terminal with refund case information related to the product to be refunded or the same type of product as the product to be refunded. In this case, the refund case information may include image information for the products to be refunded or the same type of products that have been previously refunded, and refund degree information.

Figure 4:
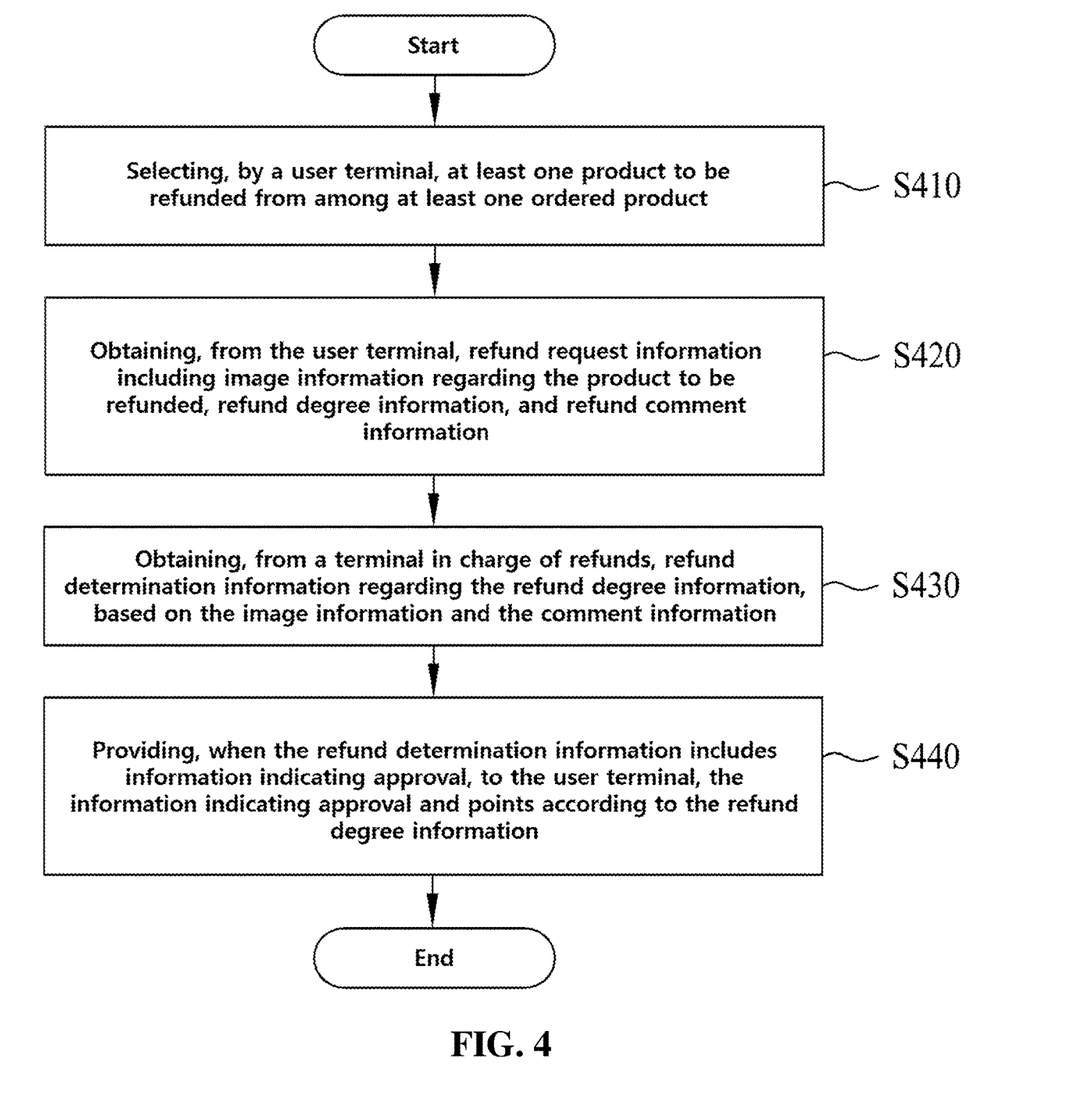
FIG. 4 is a flow chart of a refund service providing method based on refund degree information according to one embodiment of the present invention.

FIG. 4 is a flow chart of a refund service providing method based on refund degree information according to one embodiment of the present invention.

Referring to FIG. 4, according to one embodiment, at least one product to be refunded from among at least one ordered product may be selected by the user terminal (S410). The product to be refunded may be selected from among the refundable products in FIG. 2, and products within one week from the delivery completion time may be included as the refundable products from among the products ordered by the user.

According to one embodiment, refund request information including image information regarding the product to be refunded, refund degree information, and refund comment information may be obtained from the user terminal (S420). For example, the refund degree information may be one stage selected by the user terminal from among a plurality of preset refund degree stages, and the refund degree stages may indicate percentage information different from each other. In this case, the product to be refunded may be requested for refund, and included in the information on pending refund approvals in FIG. 2 and confirmed or provided.

For example, according to one embodiment, it may be determined whether the image information satisfies a preset criterion. When the image information does not satisfy the preset criterion, another image information may be requested to the user terminal. In other words, according to one embodiment, when the image according to the image information does not satisfy a preset resolution criterion or exceeds a preset capacity criterion, the image may be requested again to the user terminal. In other words, according to one embodiment, when the resolution of the image is less than a first threshold or the capacity of the image is greater than a second threshold, another image information may be requested to the user terminal. Accordingly, the image according to the image information may have the resolution greater than or equal to the first threshold and the capacity less than or equal to the second threshold. The resolution may be expressed as a value of a unit representing the number of pixels per inch area, and may represent a value in unit of dpi.

According to one embodiment, refund determination information regarding the refund degree information, based on the image information and the comment information may be obtained from the terminal in charge of refunds (S430). The refund determination information may include information indicating approval or rejection. In this case, the refund determination information may be included and provided in the information on the approved/rejected products in FIG. 2.

The terminal in charge of refunds may decide and provide refund determination information by considering not only the image information but also the modified image information. In other words, according to one embodiment, an image set based on the image information may be provided to the terminal in charge of refunds, and the refund determination information may be information decided based on the image set. The image set may include modified image information as well as the image information, and the modified image information may indicate information about an image in which brightness and/or saturation are adjusted for an image subject to the image information.

Specifically, according to one embodiment, the brightness and/or saturation may be adjusted for an image subject to the image information having the resolution greater than or equal to the first threshold and the capacity less than or equal to the second threshold based on a preset criterion, and the modified image information generated thereby may be provided to the terminal in charge of refunds together with the image information.

The modified image information may include first modification image information obtained by adjusting the brightness of the image subject to the image information to a first brightness and the saturation of the image to a first saturation, second modification image information obtained by adjusting the brightness of the image subject to the image information to a first brightness, third modification image information obtained by adjusting the brightness of the image subject to the image information to a first brightness and the saturation of the image to a second saturation, fourth modification image information obtained by adjusting the saturation of the image subject to the image information to the first saturation, fifth modification image information obtained by adjusting the saturation of the image subject to the image information to the second saturation, sixth modification image information obtained by adjusting the brightness of the image subject to the image information to a second brightness and the saturation of the image to the first saturation, seventh modification image information obtained by adjusting the brightness of the image subject to the image information to the second brightness, and eighth modification image information obtained by adjusting the brightness of the image subject to the image information to the second brightness and the saturation of the image to the second saturation.

The first brightness may represent a brightness corresponding to a value obtained by adding a preset first difference value to a value corresponding to the brightness of the image information, and the second brightness may indicate a brightness corresponding to a value obtained by subtracting the preset first difference value from the value corresponding to the brightness of the image information. For example, in the case of a value corresponding to the brightness of the image information, that is, the initial value of 50 and the first difference value of 20, a value corresponding to the brightness of the modification image adjusted to the first brightness may be 70, and a value corresponding to the brightness of the modification image adjusted to the second brightness may be 30. In other words, according to one embodiment, the modification image information may be generated by adjusting a brightness value of the image information.

The first saturation may represent a saturation corresponding to a value obtained by adding a preset second difference value to a value corresponding to the saturation of the image information, and the second saturation may represent a saturation corresponding to a value obtained by subtracting the preset second difference value from the value corresponding to the saturation of the image information. For example, in the case of a value corresponding to the saturation of the image information, that is, the initial value of 50 and the second difference value of 15, a value corresponding to the saturation of the modification image adjusted to the first saturation may be 65, and a value corresponding to the saturation of the modification image adjusted to the second saturation may be 35. In other words, according to one embodiment, the modification image information may be generated by adjusting a saturation value of the image information.

Each of the first difference value and the second difference value may be determined according to a product to be refunded, and the first difference value and the second difference value may be set identically or may be set differently depending on the product to be refunded. Thus, the present invention is not limited thereto.

The image set according to one embodiment may be represented by one set image. In this case, the one set image may be one image composed of one image according to the image information and eight modification image information. In other words, the one set image may be an image in which 9 images are arranged 3×3.

For example, the image according to the image information may be arranged in a center of the one set image, the first modification image may be arranged on an upper left side, the second modification image may be arranged on an upper side, and the third modification image may be arranged on an upper right side. In addition, the fourth modification image may be arranged on a left side, and the fifth modification image may be arranged on a right side. In addition, the sixth modification image may be arranged on a lower left side, the seventh modification image may be arranged on a lower side, and the eighth modification image may be arranged on a lower right side. In other words, the image obtained by the user terminal may be arranged in the center, the images obtained by adjusting the brightness of the image to the first brightness may be arranged at the top, and the images obtained by adjusting the brightness of the image to the second brightness may be arranged at the bottom. In addition, the images obtained by adjusting the saturation of the image to the first saturation may be arranged on the left side, and the images obtained by adjusting the saturation of the image to the second saturation may be arranged on the right side.

The one set image in which nine images are arranged according to the above description may be provided to the terminal in charge of refunds, and the person in charge of refunds at the terminal in charge of refunds may check the 9 images at once to easily identify refund causes that can be visually identified, and may easily check whether the user has treated a state of the product to be refunded by modifying the brightness and/or saturation as looking bad relatively to the naked eye.

According to one embodiment, when the refund determination information includes the information indicating approval, the information indicating approval and points according to the refund degree information may be provided to the user terminal (S440). The points may be derived based on percentage information indicated by the selected one stage and price information of the product to be refunded. In other words, points corresponding to an amount obtained by applying the percentage information to price information of a product to be refunded may be provided to the user.

However, according to one embodiment, when the refund determination information includes information indicating rejection, modified refund degree information and modification comment information may be obtained from the terminal in charge of refunds, and the modified refund degree information, the modification comment information, and the information indicating rejection may be provided to the user terminal.

Thereafter, according to one embodiment, modified refund determination information for the modified refund degree information may be obtained from the user terminal. The modified refund determination information may include information indicating approval or disapproval. In this case, according to one embodiment, when the modified refund determination information includes the information indicating approval, points according to the modified refund degree information may be provided to the user terminal. According to one embodiment, when the modified refund determination information includes the information indicating disapproval, chat consultation or phone consultation may be selected by the user terminal. When the chat consultation is selected, the user terminal may be provided with chat room link information through which chatting may be performed with the terminal in charge of refunds. When the phone consultation is selected, contact information of the user terminal may be provided to the terminal in charge of refunds.

In addition, although not shown in FIG. 4, according to one embodiment, the user terminal may be provided with refund case information related to the product to be refunded or the same type of product as the product to be refunded. The refund case information may include image information for the products to be refunded or the same type of products that have been previously refunded, and refund degree information.

The operation described with reference to FIG. 4 is merely an example and may be a part of the operations according to the embodiment of the present invention. In other words, although not shown in FIG. 4, it is apparent that various operations described with reference to FIGS. 1 to 14 or some of the various operations may be further performed in the embodiment of the present invention.

The operation according to the embodiments of the present invention may be implemented as a computer-readable program or code in a computer-readable recording medium. The computer-readable recording medium includes any kind of recording device for storing data to be read by a computer system. In addition, the computer-readable recording medium may store and execute program or code distributed to computer systems via networks and readable by computer in a distributed manner.

In addition, the computer-readable recording medium may include a hardware device specially configured to store and execute a program command such as ROM, RAM, and flash memory. The program command may include a high-level language code to be executed by a computer using an interpreter or the like, as well as a machine code created by a compiler.

Some aspects of the present invention have been described in the context of the device. However, the aspects may also represent the description according to the corresponding method, and the block or device herein corresponds to a method step or features of the method step. Similarly, aspects described in the context of a method may also represent features of a corresponding block or item or a corresponding device. Some or all of the method step may be performed, for example, by (or using) a hardware device such as a microprocessor, a programmable computer, or an electronic circuit. In some embodiments, one or more of the most important method steps may be performed by the above device.

In the embodiments, a programmable logic device (for example, a field programmable gate array) may be used to perform some or all of functions of the methods described herein. In the embodiments, the field programmable gate array may be operated with a microprocessor for performing one of the methods described herein. In general, it may be preferable that the methods are performed by a predetermined hardware device.

Although the present invention has been described with reference to exemplary embodiments, it will be apparent to a person having ordinary skill in the art that various modifications and variations can be made in the present invention without departing from the scope and field of the following appended claims.

The invention claimed is:

1. A refund service providing method based on refund degree information, the refund service providing method comprising:
  obtaining, from a user terminal, refund request information including image information regarding a product to be refunded, refund degree information, and refund comment information in response to a selection by the user terminal the product to be refunded among at least one ordered product;
  obtaining, from a terminal in charge of refunds, refund determination information regarding the refund degree information, based on the image information and the refund comment information, wherein the refund determination information includes information indicating approval or rejection;
  when the refund determination information includes the information indicating approval, providing, to the user terminal, the information indicating approval and points according to the refund degree information,
  wherein the refund degree information includes one stage selected by the user terminal from among a plurality of preset refund degree stages, the plurality of preset refund degree stages indicate percentage information different from each other, the points are derived based on percentage information indicated by the one stage selected, final percentage information derived based on an added percentage according to member level information of a user corresponding to the user terminal, and price information of the product to be refunded;
  providing the user terminal with refund case information related to the product to be refunded or a same type of product as the product to be refunded, wherein the refund case information includes the image information for the product to be refunded or a same type of products that have been previously refunded, and the refund degree information, an image subject to the image information has a resolution greater than or equal to a first threshold value and the image has a capacity less than or equal to a second threshold value, the resolution is expressed based on a number of pixels per inch area;
  requesting another image information to the user terminal when the image has a resolution less than the first threshold value or the image has a capacity greater than the second threshold value;
  generating modified image information based on the image information;
  providing the terminal in charge of refunds with an image set including the image information and modified image information, wherein the refund determination information is obtained based on the image set, the modified image information includes first modification image information obtained by adjusting a brightness of the image subject to the image information by a preset brightness difference value, second modification image information obtained by adjusting a saturation of the image subject to the image information by a preset saturation difference value, and third modification image information obtained by adjusting the brightness of the image subject to the image information by the preset brightness difference value and adjusting the saturation of the image by the preset saturation difference value, and the preset brightness difference value and the preset saturation difference value are set differently depending on the product to be refunded;

obtaining modified refund degree information and modification comment information from the terminal in charge of refunds when the refund determination information includes the information indicating rejection;

providing the user terminal with the modified refund degree information, the modification comment information, and the information indicating rejection;

obtaining modified refund determination information for the modified refund degree information from the user terminal in which the modified refund determination information includes information indicating approval or disapproval by the user terminal;

instructing the user terminal with a chat consultation when the modified refund determination information includes the information indicating disapproval; and providing the user terminal with chat room link information for allowing a chat with the terminal in charge of refunds when the chat consultation is selected by the user terminal.

2. The refund service providing method of claim 1 further comprising:

providing points according to the modified refund degree information to the user terminal when the modified refund determination information includes the information indicating approval.

3. The refund service providing method of claim 2, further comprising:

providing contact information of the user terminal to the terminal in charge of refunds when a phone consultation is selected by the user terminal.

* * * * *